(12) United States Patent
Hyon

(10) Patent No.: US 6,409,112 B1
(45) Date of Patent: Jun. 25, 2002

(54) DUAL-BEARING REEL HAVING CONTROL KNOB FOR ADJUSTING BRAKING FORCE

(75) Inventor: KwangHo Hyon, KyongKi-Do (KR)

(73) Assignee: Toyo Engineering Co., Ltd., Kyongki-do (KR)

( * ) Notice: Subject to any disclaimer, the term of this patent is extended or adjusted under 35 U.S.C. 154(b) by 0 days.

(21) Appl. No.: 09/650,617

(22) Filed: Aug. 30, 2000

(30) Foreign Application Priority Data

Sep. 2, 1999 (KR) .............................................. 99-37982

(51) Int. Cl.⁷ .............................................. A01K 89/02
(52) U.S. Cl. ........................ 242/285; 242/244; 242/306
(58) Field of Search ................................ 242/243, 244, 242/285, 290, 306

(56) References Cited

U.S. PATENT DOCUMENTS

| | | | |
|---|---|---|---|
| 3,532,296 A | * 10/1970 | Murvall | 242/290 |
| 4,371,124 A | * 2/1983 | Gifford et al. | 242/306 |
| 4,470,554 A | * 9/1984 | Kobayashi et al. | 242/243 |
| 4,591,108 A | * 5/1986 | Ban | 242/306 |
| 4,598,879 A | * 7/1986 | Fujigiwa | 242/306 |
| 4,804,150 A | * 2/1989 | Takeuchi | 242/244 |
| 4,930,723 A | * 6/1990 | Toda | 242/285 |
| 4,988,057 A | * 1/1991 | Hitomi | 242/306 |
| 5,297,757 A | * 3/1994 | Johansson et al. | 242/306 |
| 5,374,002 A | * 12/1994 | Sato | 242/290 |
| 5,692,692 A | * 12/1997 | Zwayer | 242/244 |
| 6,039,278 A | * 3/2000 | Tao | 242/244 |

* cited by examiner

*Primary Examiner*—Emmanuel M. Marcelo
(74) *Attorney, Agent, or Firm*—Notaro & Michalos P.C.

(57) ABSTRACT

A dual-bearing reel has a control knob for adjusting a braking force applied to a spool shaft. The reel includes a spring-biased click pin inside the control knob. The click pin is movably biased against a plate having concave grooves held within the control knob. The plate is arranged to rotate with the control knob. When the control knob is rotated, one end of the click pin strikes the concave grooves, thereby generating a click sound.

1 Claim, 4 Drawing Sheets

DUAL-BEARING REEL HAVING CONTROL KNOB FOR ADJUSTING BRAKING FORCE

BACKGROUND OF THE INVENTION

1. Field of the Invention

The present invention relates to a dual-bearing reel called as a bait casting reel, and more particularly to a dual-bearing reel including a control knob capable of generating a click sound, wherein a friction force to be applied to a spool shaft may be adjusted with reference to the number of times that the click sound is generated.

2. Description of the Related Art

Bait Dual-bearing reels are generally constructed in such a way that a pinion is rotated with a gear train driven in response to the rotation of a handle, and a spool is rotated in the winding direction by transferring the rotating force of the pinion to a spool shaft.

When such a dual-bearing reels is used, a fishing line may be excessively released from the spool by casting a sinker and a bait by means of a reel, so that the fishing line may be tangled up on the spool. In order to prevent such a tangle problem, the dual-bearing reels use a centrifugal brake. Since the centrifugal brake has a limited braking force, the rotating speed of the spool is controlled by applying the braking force to the spool shaft.

With the construction of such a dual-bearing reel, one side cover includes a control knob fixing arm protruded therefrom and having a threaded portion on its periphery. A control knob is engaged to the threaded portion of the control knob fixing arm, with a cushion washer and a sliding washer being interposed between the control knob and the control knob fixing arm. The other side cover also has a sliding washer therein, and both ends of the spool shaft are inserted into the sliding washers of the side covers.

Upon the rotation of the control knob in a right or left direction, the control knob can be released from or unreleased to the control knob fixing arm, so that both ends of the spool shaft can be applied with a braking force by means of the sliding washers and vice versa, thereby controlling the rotation of the spool shaft.

With construction of the prior art dual-bearing reel, a user can not confirm a rotated amount of the control knob (in other words, released or unreleased amount of the control knob relative to the control knob fixing arm).

SUMMARY OF THE INVENTION

Accordingly, to solve the problems stated above, an object of the present invention is to provide a dual-bearing reel having a click sound producing mechanism to allow a released or unreleased state of a control knob to be exactly confirmed, thereby precisely adjusting a friction force of a spool shaft by means of the control knob.

Another object of the present invention is to provide a dual-bearing reel having a control knob fixing arm with no screwed portion, thereby increasing the productivity thereof In accordance with these and other objects, in one embodiment of the invention, there is provided a dual-bearing reel having a control knob for adjusting a braking force to be transferred to a spool shaft. The reel comprises a control knob fixing arm protruding from a side cover of the reel; a pin holder having a boss inserted into a groove of the control knob fixing arm and a groove for receiving a ring; a spring positioned in a hole of the pin holder to support a pin; a plate interposed between the control knob and the control knob fixing arm and having a plurality of locking grooves on an outer periphery thereof and a plurality of concave grooves in close to a center hole thereof; and a nut having a groove inserted into the control knob fixing arm.

The pin extends to the locking groove of the plate through the control knob, so that when the control knob rotates one end of the pin strikes the concave grooves, thereby generating a click sound.

BRIEF DESCRIPTION OF THE DRAWINGS

The above objects, other features and advantages of the present invention will become more apparent by describing the preferred embodiment thereof with reference to the accompanying drawings, in which.

DETAILED DESCRIPTION OF THE PREFERRED EMBODIMENT

The construction and operation of the present invention will be explained in detail with reference to the accompanying drawings.

Figure 1B:
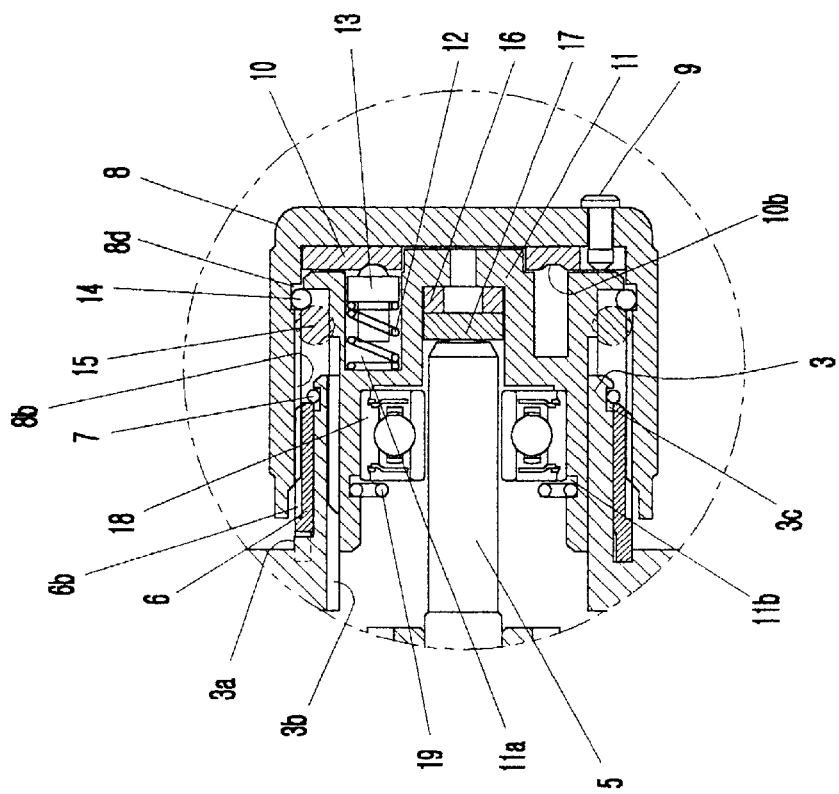
FIG. 1B is a magnified view of the control knob of the reel of FIG. 1A.
Figure 1A:
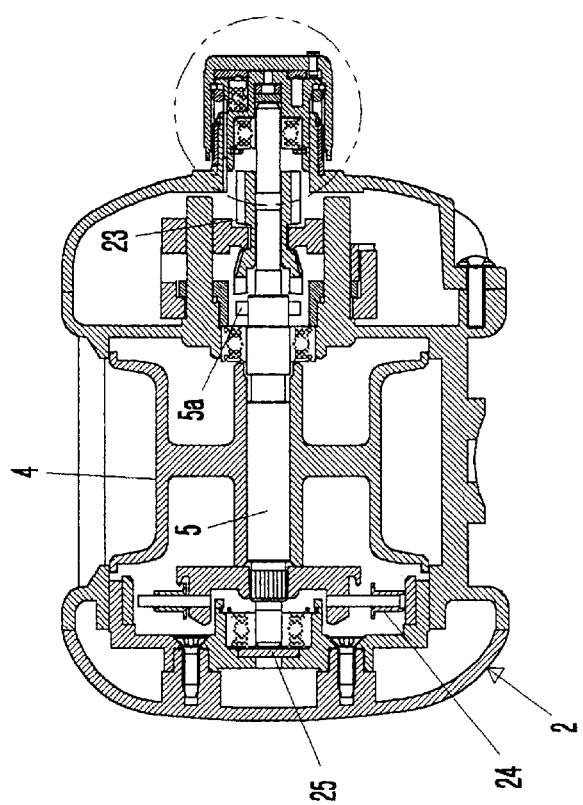
FIG. 1A is a cross-sectional view illustrating the assembled state of a dual-bearing reel according to the invention.
Figure 2:
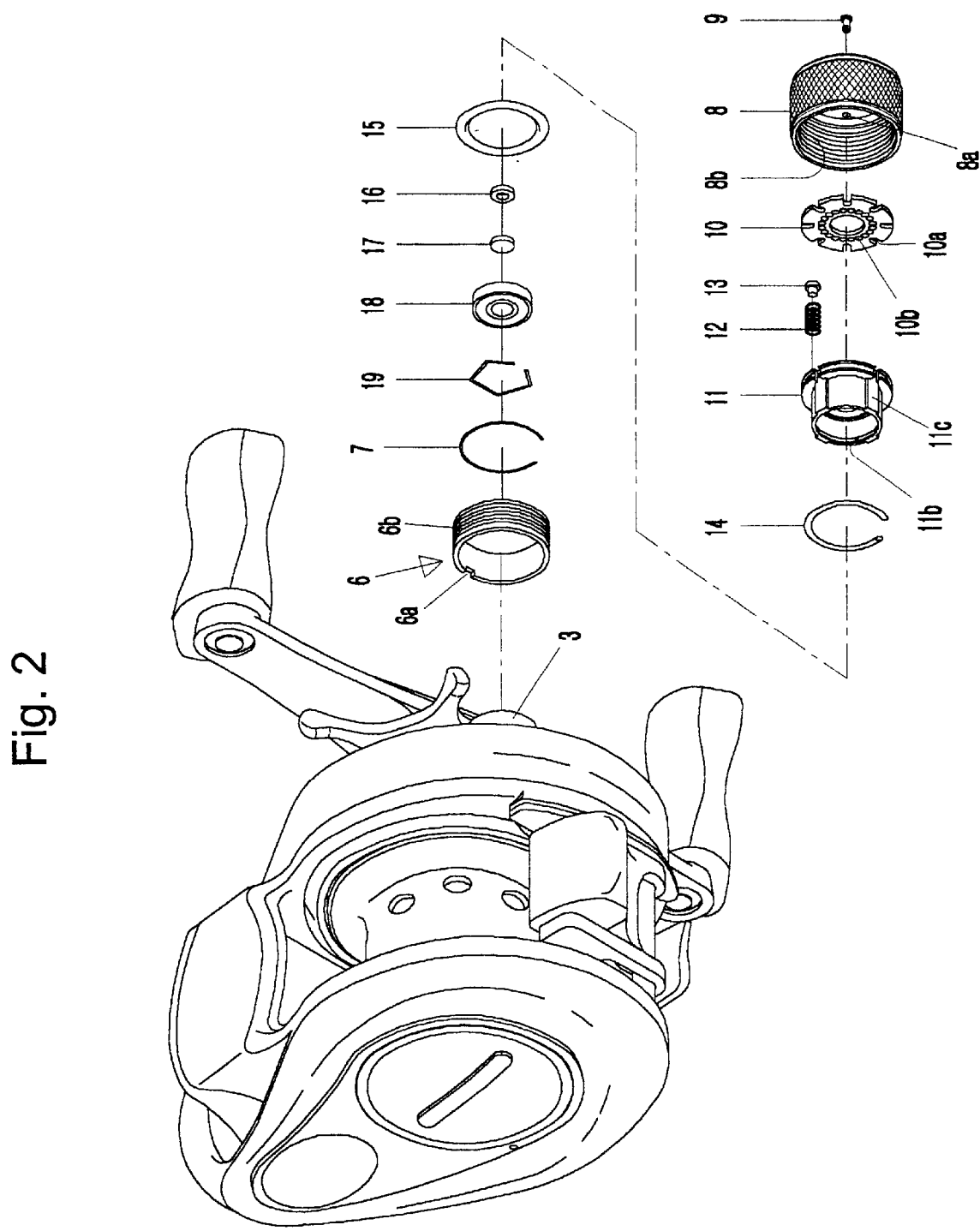
FIG. 2 is an exploded view illustrating the construction of a dual-bearing reel according to the present invention.
Figure 5:
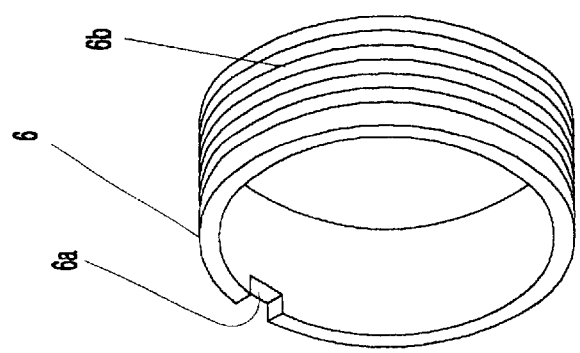
FIG. 5 is a perspective view illustrating a nut of the present invention.
Figure 4:
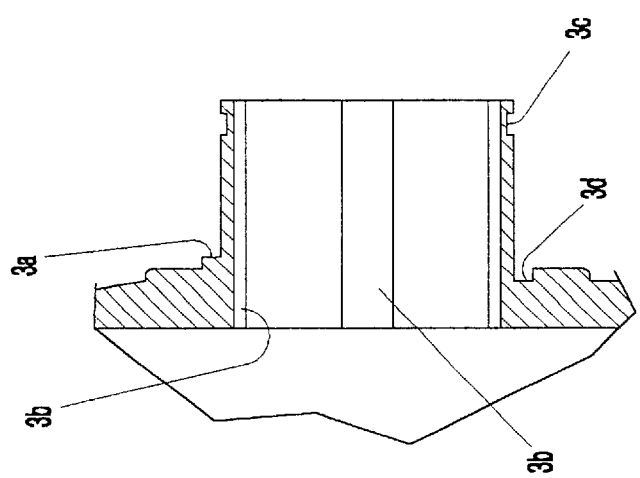
FIG. 4 is a cross-sectional view taken along line IV—IV of FIG. 3;.
Figure 3:
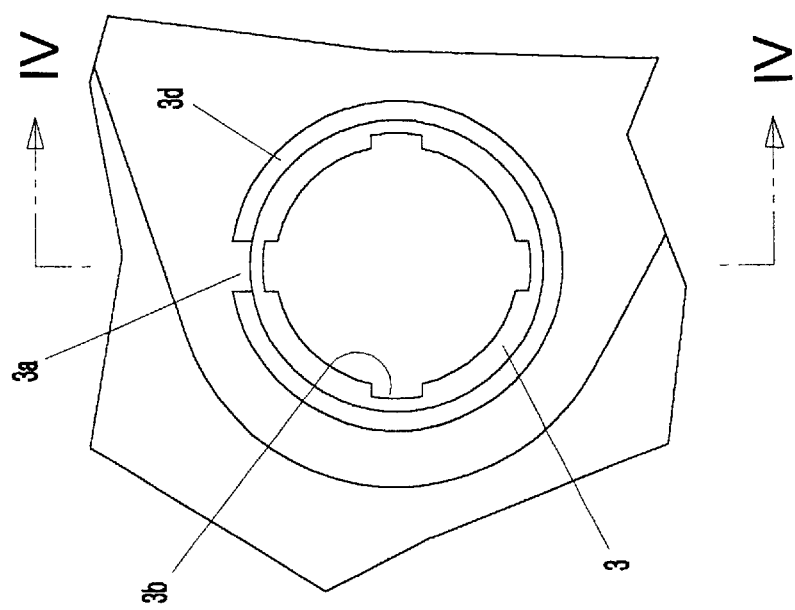
FIG. 3 is a front view illustrating a control knob fixing arm of the present invention.

Referring to FIG. 1, a locking pin 5a of a spool shaft 5 is released from a pinion 23, so that a spool 4 may be rotated freely. A brake 24 applies a braking force to the spool shaft 5, and a control knob 8 also applies a braking force to the spool shaft 5. A control knob fixing arm 3 is engaged with a nut 6, with a groove 6a formed on the nut 6 being latched on a stopping boss 3a of the control knob fixing arm 3. The nut 6 has a ring 7 so as not to be released from the control knob fixing arm. A pin holder 11 is inserted in the control knob fixing arm 3, and a boss 11c of the pin holder is inserted into a groove 3b of the control knob fixing arm.

The control knob 8 is engaged with the control knob fixing arm 3, with a plate 10 having a plurality of locking grooves 10a on the outer periphery of plate 10 interposed between the control knob 8 and control knob fixing arm 3. A locking pin 9 inserted through the control knob 8 and one of the locking grooves 10a maintains the position of the plate 10.

A spring 12 is positioned in a hole 11a of the pin holder 11 to support a click pin 13. One end of the click pin 13 is inserted in one of a plurality of concave grooves 10b of the plate 10 by a biasing force of the spring 12. When the control knob 8 rotates to the left or right, the plate 10 also rotates in the same direction with the control knob 8, and the click pin 13 positioned in the groove 10b generates a click sound as it moves across others of the concave grooves 10b.

With the construction described above, a user can check the number of times that the click sound generates (the sound is generated when the pin 13 moves across the groove 10*b*). After casting, the user determines whether or not it is necessary to apply an additional friction force to the spool shaft, depending upon the rotating state of the spool. Therefore, the user can determine an exactly amount of friction force to be applied to the spool shaft.

By calculating a pitch of thread ridge of the nut 6 and the number of grooves 10*b*, if the click sound is generated once, the user may know the shifted distance of the control knob on the nut 6. The rotating amount of the control knob is relative to the distance of the control knob moving on the spool shaft. Therefore, the friction force applied to the both ends of the spool shaft may be adjusted by calculating the shifted distance of the control knob. The user can calculate the friction force applied to the spool shaft by merely hearing the click sound.

In the above construction, instead of the use of the nut 6 to fix the control knob, the control knob is directly engaged to a threaded portion of the control knob fixing arm. Since the control knob fixing arm is integrally formed with a side cover, with its outer surface having a complex curved shape, it is very difficult to machine a male thread on the control knob fixing arm, thereby decreasing the productivity. The above problem may be solved by fastening the nut 6 on the control knob fixing arm, and the disassembly of the control knob is easily achieved by the nut.

Preferably, a ring 14 and a rubber ring 15 may be interposed between the pin holder 11 and the control knob 8, so that the control knob 8 can be rotated with a slightly operating force being applied. The ring 14 is inserted in a groove 8*d* formed on the control knob. If necessary, the ring 14 may be omitted, and the rubber ring 15 only may be used, as shown in FIG. 7.

Figure 8:
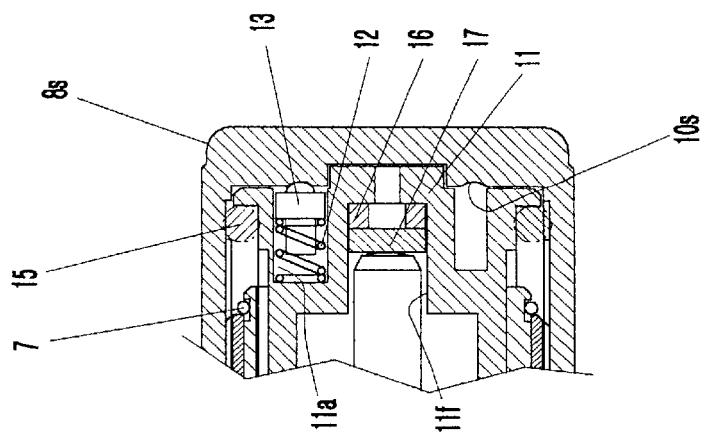
FIGS. 7 and 8 are views of an alternative preferred embodiment of the present invention.
Figure 7:
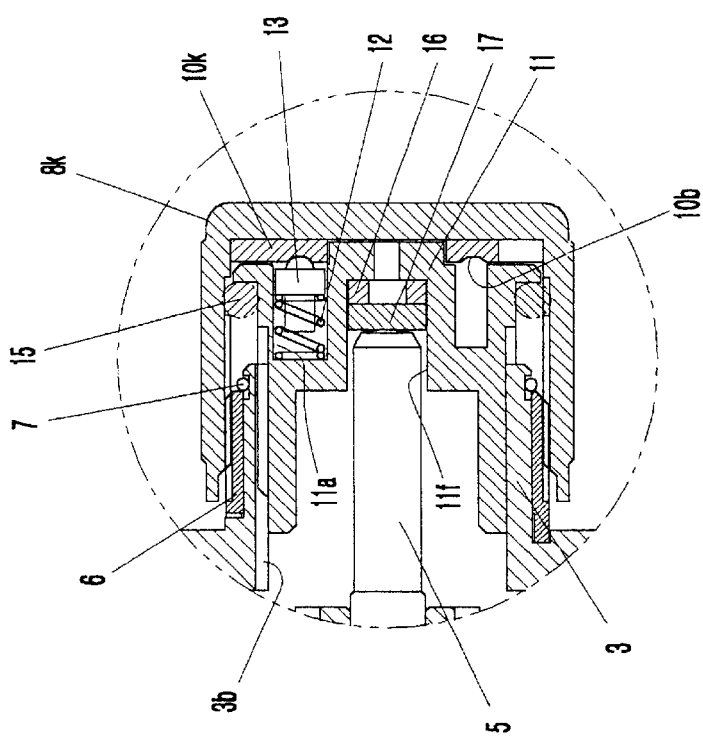
Figure 6:
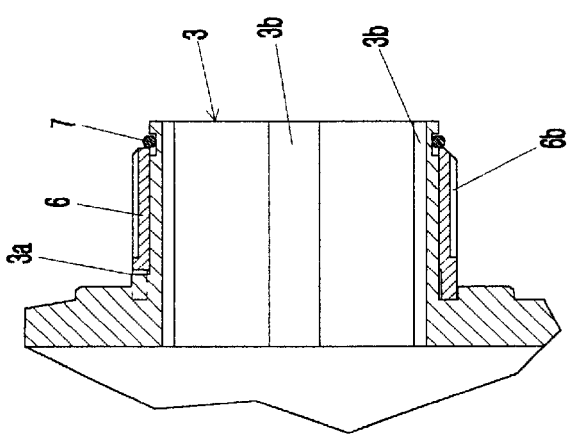
FIG. 6 is a partially cutaway view of the construction of the dual-bearing reel according to the present invention.

FIG. 7 shows an alternative embodiment of the present invention, wherein a plate 10*k* having no a locking groove is used and a control knob 8*k* having no a pin is used. In the alternative embodiment, the plate 10*k* is forcibly inserted in the control knob 8*k*, or is secured to the control knob by welding or adhering. FIG. 8 shows an another alternative embodiment of the present invention, wherein the above plate is not used and a control knob 8*s* has a groove 10*s* only on an inner surface of the knob. The alternative embodiments described above can reduce the weight of the reel.

With the construction of the present invention, when the control knob rotates, the click sound generates by contacting the pin with the groove. By considering the click sound, a user can determine an exactly amount of friction force to be applied to the spool shaft. In addition, the distance of casting may be longer than that of the prior art.

Although the present invention has been described with reference to the drawings, it is understood that this description is not to limit the present invention to the embodiments shown in the drawings but simply to explain the present invention. One skilled in the art will understand that various changes and modifications can be made from the embodiments disclosed in the specification. Therefore, the scope of the present invention should be defined by the appended claims.

What is claimed is:

1. A dual-bearing reel having a control knob for adjusting a braking force to be transferred to a spool shaft, the reel comprising:

a control knob fixing arm protruding from a side cover of the reel;

a pin holder having a boss inserted into a groove of the control knob fixing arm, and a groove for receiving a ring;

a spring positioned in a hole of the pin holder to support a click pin;

a plate being interposed between the control knob and the control knob fixing arm, the plate having a plurality of locking grooves on an outer periphery thereof and a plurality of concave grooves adjacent a center hole thereof;

a nut having a groove inserted into the control knob fixing arm;

a locking pin extending into one of the plurality of locking grooves through the control knob, wherein when the control knob is rotated, the plate is caused to rotate with the control knob and one end of the click pin strikes the concave grooves to generate a click sound.

* * * * *